United States Patent
Krimmel

[15] 3,671,527
[45] June 20, 1972

[54] DIALKYLAMINOALKYL ESTERS OF ADAMANTANETHIOCARBOXYLIC ACIDS

[72] Inventor: Carl Peter Krimmel, Wauconda, Ill.

[73] Assignee: G. D. Searle & Co., Chicago, Ill.

[22] Filed: July 6, 1970

[21] Appl. No.: 52,703

Related U.S. Application Data

[63] Continuation-in-part of Ser. No. 644,099, June 7, 1967, Pat. No. 3,565,942, which is a continuation-in-part of Ser. No. 466,812, June 24, 1965, abandoned.

[52] U.S. Cl..............260/268 PC, 260/247.1, 260/294.4 C, 260/455 C, 260/326.82
[51] Int. Cl. .......................................................C07d 51/70
[58] Field of Search..................260/268 PC, 455 C, 293.4 C, 260/247.1

[56] References Cited

UNITED STATES PATENTS

| | | | |
|---|---|---|---|
| 3,374,244 | 3/1968 | Krimmel | 260/268 PC |
| 3,464,998 | 9/1969 | Krimmel | 260/294.8 |
| 3,472,895 | 10/1969 | Gray | 260/268 PC |

*Primary Examiner*—Donald G. Daus
*Attorney*—John M. Brown, John J. Kolano, Elliot N. Schubert, Lowell C. Bergstedt, Sybil Meloy, Walter C. Ramm and Helmuth A. Wegner

[57] ABSTRACT

The present dialkylaminoalkyl and related esters of adamantanethiocarboxylic acids possess anti-inflammatory activity and activity against a variety of organisms. Thus, they are anti-bacterial, anti-protozoal, anti-fungal, and anti-algal agents. The compounds are prepared by the reaction of an adamantanecarboxylic acid halide with an appropriate dialkylaminoalkanethiol or similar compounds.

4 Claims, No Drawings

DIALKYLAMINOALKYL ESTERS OF ADAMANTANETHIOCARBOXYLIC ACIDS

The present application is a continuation-in-part of application Ser. No. 644,099, filed June 7, 1967, now U.S. Pat. No. 3,565,942. That application is, in turn, a continuation-in-part of application Ser. No. 466,812, filed June 24, 1965, and now abandoned.

The present invention relates to a group of aminoalkyl esters of adamantanethiocarboxylic acid and homoadamantanethiocarboxylic acid. More particularly, it relates to a group of compounds having the following general formula

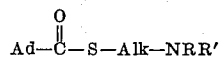

wherein Ad is selected from the group consisting of adamantyl and homoadamantyl with, in each case, the free valence occuring at a bridgehead position; Alk is a lower alkylene radical separating the atoms attached thereto by at least two carbon atoms; —NRR' is selected from the group consisting of di(lower alkyl)amino and cyclic amino. Examples of cyclic amino radicals are 1-pyrrolidinyl, piperidino, morpholino, and 4-methyl-1-piperazinyl.

The lower alkylene radicals referred to above contain up to six carbon atoms and can be exemplified by radicals such as ethylene, propylene, trimethylene, and tetramethylene. The lower alkyl radicals referred to above likewise contain up to six carbon atoms and can be exemplified by radicals such as methyl, ethyl, propyl, isopropyl, and butyl.

The organic bases of this invention form pharmaceutically acceptable salts with a variety of inorganic and strong organic acids. Such salts are formed with the acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthymethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of the present invention are prepared by the reaction of an adamantanecarbonyl halide or a homoadamantanecarbonyl halide with an appropriate aminoalkanol or an aminoalkanethiol in the presence of a tertiary base such as pyridine. The acid chloride is preferred for this reaction.

The compounds of the present invention are useful because of their pharmacological properties. In particular, the present compounds possess anti-inflammatory activity. Thus, they have a phenylbutazone-like effect on edematous conditions. These compounds have also been found to be bradykinin antagonists.

The present compounds also possess anti-biotic activity against a variety of organisms. Thus, they inhibit the growth of bacteria such as *Bacillus subtilis*, *Escherichia coli*, and *Diplococcus pneumoniae*, protozoa such as *Tetrahymena gelleii*, fungi such as *Trichophyton mentagrophytes* and *Candida albicans*, and algae such as *Chlorella vulgaris*. The present compounds can thus be combined with various known excipients and adjuvants in the form of dusts, solutions, suspensions, ointments, and sprays to provide compositions useful for disinfecting purposes.

The present compounds also inhibit germination of seeds of Trifolium.

The following examples are presented to further illustrate the present invention; they should not be construed as limiting it in spirit or in scope. In these examples, quantities by weight are indicated in grams, quantities by volume are indicated in milliliters, and temperatures are indicated in degrees centigrade (°C.).

EXAMPLE 1

To a stirred refluxing solution of 6 grams of adamantane-1-carboxylic acid in 60 ml. of anhydrous 2-propanol there is added 4.5 grams of 2-diethylaminoethyl chloride. The resultant mixture is refluxed for 4 hours and then cooled to room temperature and filtered to remove traces of insoluble solids.

The solvent is evaporated from the filtrate under reduced pressure and the residue is dissolved in dilute hydrochloric acid. The hydrochloric acid solution is filtered to remove acid insoluble solids and it is then treated with activated charcoal and made alkaline by the addition of sodium hydroxide. The alkaline solution is extracted with ether and the ether solution is treated with activated charcoal and dried over anhydrous calcium sulfate. The solvent is evaporated from the either solution and the residue is distilled to give a clear, colorless oil boiling at about 164°–166° C. at 3.5 mm. The product thus obtained is 2-diethylaminoethyl adamantane-1-carboxylate.

3.8 Grams of this ester is dissolved in 40 ml. of 2-butanone and mixed with an equivalent of hydrogen chloride in a 2-propanol solution containing 0.23 grams of hydrogen chloride per milliliter of solution. 100 ml. of anhydrous ether is stirred into the resultant white suspension. The mixture is filtered and the separated solid is washed with anhydrous ether and then dried to give 2-diethylaminoethyl adamantane-1-carboxylate hydrochloride melting at about 180°–183° C. The free base of this compound has the following formula

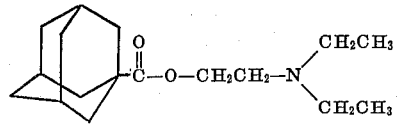

EXAMPLE 2

8.1 grams of adamantane-1-carboxylic acid dissolved in 90 ml. of 2-propanol is reacted with 9.0 grams of 3-diethylaminopropyl chloride according to the procedure described in Example 1. The crude product obtained by evaporation of the 2-propanol solvent is dissolved in 200 ml. of distilled water with vigorous shaking. The resultant aqueous solution is then filtered through decolorizing charcoal and made alkaline by the addition of 10 percent sodium hydroxide solution. The alkaline solution is extracted with ether and the ether extract is treated with charcoal and then dried over anhydrous calcium sulfate. The solvent is evaporated from the ether solution and the residue is distilled to give a straw-colored oil boiling at about 175°–177° C. at 3.0 mm. The product thus obtained is 3-diethylaminopropyl adamantane-1-carboxylate.

A solution of 3.5 grams of this ester in 20 ml. of 2-butanone is mixed with 2.0 ml. of a solution containing 0.23 gram of hydrogen chloride per milliliter of anhydrous 2-propanol. A thick white percipitate forms and the mixture is diluted with 10 ml. of 2-butanone and filtered. The separated solid is washed with 2-butanone and then dried to give 3-diethylaminopropyl adamantane-1-carboxylate hydrochloride melting at about 171°–173° C.

EXAMPLE 3

A mixture of 1.8 grams of 3-diethylaminopropyl adamantane-1-carboxylate, 2.6 grams of ethyl bromide, and 10 ml. of 2-butanone is refluxed on a steam bath for 2 hours. The resultant mixture is then allowed to cool and stand at room temperature for 16 hours. The white crystalline precipitate which forms is filtered, washed with anhydrous ether, and dried to give 3-diethylaminopropyl adamantane-1-carboxylate ethobromide melting at about 173°–183° C. This compound has the following formula

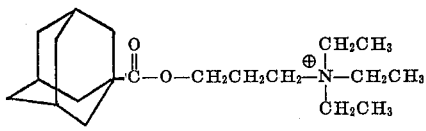

EXAMPLE 4

2-Dimethylaminoethyl chloride and 3-dimethylaminopropyl chloride are each reacted with adamantane-1-carboxylic acid according to the procedure described in Example 1 to give, respectively, 2-dimethylaminoethyl adamantane-1-carboxylate and 3-dimethylaminopropyl adamantane-1-carboxylate.

EXAMPLE 5

1-(2-Chloroethyl)piperidine, 1-(2-chloroethyl)-pyrrolidine, 4-(2-chloroethyl)morpholine, and 1-(2-chloroethyl)-4-methylpiperazine are each reacted with adamantane-1-carboxylic acid according to the procedure described in Example 1 to give the corresponding ester in each instance.

EXAMPLE 6

A mixture of 4.0 grams of adamantane-1-carboxylic acid and 30 ml. of thionyl chloride is refluxed on a steam bath for 30 minutes. Excess thionyl chloride is removed by distillation at reduced pressure and final traces of thionyl chloride are removed by adding azeotropically dried benzene and resuming vacuum distillation. The residual adamantane-1-carbonyl chloride is then dissolved in 25 ml. of anhydrous pyridine. A suspension of 4.0 grams of 2-dimethylaminoethanethiol hydrochloride in 30 ml. of anhydrous pyridine is added to the acid chloride with stirring. The reaction mixture is then heated on a steam bath for 30 minutes and filtered hot. The filtrate thus obtained is cooled and a white precipitate is formed. This is separated by filtration, suspended in 2-butanone, and filtered again. The resultant solid is then dried to give S-(2-dimethylaminoethyl) adamantane-1-thiocarboxylate as the hydrochloride melting at about 234°–252° C. The free base of this compound has the following formula

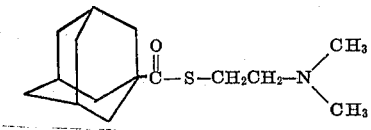

EXAMPLE 7

To a stirred, refluxing solution of 6 grams of homoadamantane-3-carboxylic acid in 60 ml. of anhydrous 2-propanol there is added 4.2 grams of 2-diethylaminoethyl chloride. The resultant mixture is refluxed for 4 hours and then cooled to room temperature and filtered to remove traces of insoluble solid. The filtrate is then heated on a steam bath under reduced pressure to remove the 2-propanol solvent. The resultant residue is then treated with 150 ml. of distilled water and, after vigorous stirring, it is filtered to remove undissolved material. The aqueous filtrate is then further diluted with 200 ml. of distilled water and the slight turbidity which develops is removed by filtering the mixture through diatomaceous earth. The clarified filtrate is then made alkaline by the addition of 10 percent sodium hydroxide solution. An emulsion forms and it is extracted with anhydrous ether. The ether extract is dried over anhydrous calcium sulfate, treated with charcoal, and filtered. The ether solvent is removed from the filtrate by heating it on a steam bath under reduced pressure. The residue is then further distilled to give 2-diethylaminoethyl homoadamantane-3-carboxylate, boiling at about 175°–177° C. at 2.5–3.0 mm. pressure.

To a solution of 2.9 grams of the foregoing product dissolved in 30 ml. of 2-butanone there is added, with stirring, an equivalent quantity of anhydrous isopropanolic hydrogen chloride solution. A thick crystalline slurry forms; this percipitate is separated by filtration, washed with 2-butanone, and dried to give 2-diethylaminoethyl homoadamantane-3-carboxylate hydrochloride, melting at about 182°–185° C. The addition of 5 mg. of this compound to an agar plate inoculated with Candida albicans inhibits the growth of this organism.

EXAMPLE 8

The procedure of Example 6 is repeated using 7.2 grams of adamantane-1-carboxylic acid and 40 ml. of thionyl chloride to give adamantane-1-carbonyl chloride. The acid chloride is suspended in 50 ml. of anhydrous pyridine and to it is added, with stirring, a mixture of 2-diethylaminoethanethiol hydrochloride in 50 ml. of anhydrous pyridine. The mixture is heated on a steam bath for three hours and the pyridine is then evaporated on the steam bath under reduced pressure. The residue is cooled and the slurry which forms is separated by filtration, washed with benzene, and extracted with 150 ml. of refluxing benzene. The hot extract is decanted, filtered hot, and then cooled. White needle-like crystals form. These are separated by filtration to give S-(2-diethylaminoethyl) adamantane-1-thiocarboxylate hydrochloride melting at about 174°–184° C.

A solution of 1.0 gram of S-(diethylaminoethyl) adamantane-1-thiocarboxylate hydrochloride in 100 ml. of distilled water is made alkaline by the addition of a solution of 0.2 gram of sodium hydroxide in 50 ml. of distilled water. The resulting mixture is extracted with anhydrous ethyl ether and the combined extracts are washed with three 50 ml. portions of water. The washed extract is dried over anhydrous sodium sulfate and filtered; the solvent is evaporated from the filtrate on a steam bath. The residue is dissolved in 10 ml. of anhydrous ethyl ether and this solution is added, with stirring, to a solution of 0.3 gram of anhydrous oxalic acid in 100 ml. of anhydrous ethyl ether. The precipitate which forms is separated by filtration, washed with anhydrous ethyl ether, and dried in a steam cabinet to give S-(2-diethylaminoethyl) adamantane-1-thiocarboxylate oxalate melting at about 149°–151° C.

EXAMPLE 9

The procedure of Example 6 is used to prepare adamantane-1-carbonyl chloride from 7.2 grams of adamantane-1-carboxylic acid and 40 ml. of thionyl chloride. The acid chloride is dissolved in 40 ml. of azeotropically dried benzene, and a solution of 6.4 grams of 2-(4-methyl-1-piperazinyl)ethanethiol in 40 ml. of azeotropically dried benzene is added in one batch at room temperature with stirring. The reaction mixture is allowed to stand and cool to room temperature. The white precipitate which forms is separated by filtration, washed with benzene, and dried. It is then stirred vigorously with hot anhydrous 2-propanol and filtered hot. The filtrate is concentrated to a volume of about 300 ml. and then cooled to room temperature. The resultant precipitate is separated by filtration and dried in a steam cabinet to give S-[2-(4-methyl-1-piperazinyl)ethyl] adamantane-1-thiocarboxylate as the dihydrochloride melting at about 262°–284° C. Additional product is present in the crystallization filtrate where it is largely in the form of the free base.

EXAMPLE 10

Homoadamantane-3-carboxylic acid is converted to the acid chloride by the procedure described in Example 6. The homoadamantane-3-carbonyl chloride obtained in this way is then reacted with 2-dimethylaminoethanethiol hydrochloride according to the procedure described in Example 6. The product obtained in this way is S-(2-dimethylaminoethyl) homoadamantane-3-thiocarboxylate.

EXAMPLE 11

3-Diethylaminopropanethiol, 2-piperidinoethanethiol, and 2-morpholinoethanethiol are each reacted with adamantane-1-carbonyl chloride according to the procedure described in Example 8. The products obtained are, respectively, S-(3-diethylaminopropyl) adamantane-1-thiocarboxylate, S-(2-piperidinoethyl) adamantane-1-thiocarboxylate, and S-(2-morpholinoethyl) adamantane-1-thiocarboxylate.

What is claimed is:

1. A member selected from the group consisting of compounds of the formula

wherein Ad is selected from the group consisting of adamantyl and homoadamantyl; Alk is lower alkylene separating the atoms attached thereto by at least two carbon atoms; and -NRR' is selected from the group consisting of di(lower alkyl)amino, piperidino, morpholino, and 4-methyl-1-piperazinyl; and the acid addition and lower alkyl halide quaternary ammonium salts thereof.

2. A compound according to claim 1 which has the formula

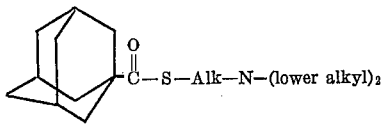

wherein Alk is lower alkylene separating the atoms attached thereto by at least two carbon atoms.

3. A compound according to claim 1 which is S-(2-dimethylaminoethyl) adamantane-1-thiocarboxylate.

4. A compound according to claim 1 which is S-[2-methyl-1-piperazinyl)ethyl] adamantane-1-thiocarboxylate.

* * * * *